Dec. 5, 1961 A. T. PUDER 3,012,161
ROTOR
Filed June 7, 1957

INVENTOR.
Allen T. Puder
BY
D. Gordon Angus
ATTORNEY.

3,012,161
Patented Dec. 5, 1961

3,012,161
ROTOR
Allen T. Puder, Altadena, Calif., assignor, by mesne assignments, to Borg-Warner Corporation, Chicago, Ill., a corporation of Illinois
Filed June 7, 1957, Ser. No. 664,308
2 Claims. (Cl. 310—156)

This invention relates to electric generators, and in particular to a permanent magnet-type rotor for such a generator.

There is a growing demand for small generators capable of being driven at high rates of speed, often as high as 48,600 revolutions per minute. Such speeds impose great stresses on the rotors of such machinery. Small dimensional unbalances in such rotors may easily produce unbalanced forces of 200 g. to 300 g. at such high rates of rotation. Therefore it is a matter of considerable importance that rotors for these applications be initially rigid and strong enough to resist unbalanced deformation as a consequence of high-speed rotation.

An object of this invention is to provide a rotor for an electric generator, which rotor is inherently simple, rugged, and capable of withstanding large centrifugal forces without substantial deformation.

According to this invention, a rotor for a generator is made up of pole pieces which are built up in laminated sheets that have a central opening for receiving a one-piece permanent magnet. This opening is smoothly curved at the poles of the magnet, and the magnet is force fitted into the said opening. The pole pieces are then held together by hubs which are clamped together by fasteners.

The above and other features of this invention will be fully understood from the following detailed description and the accompanying drawings, of which:

Figure 1:
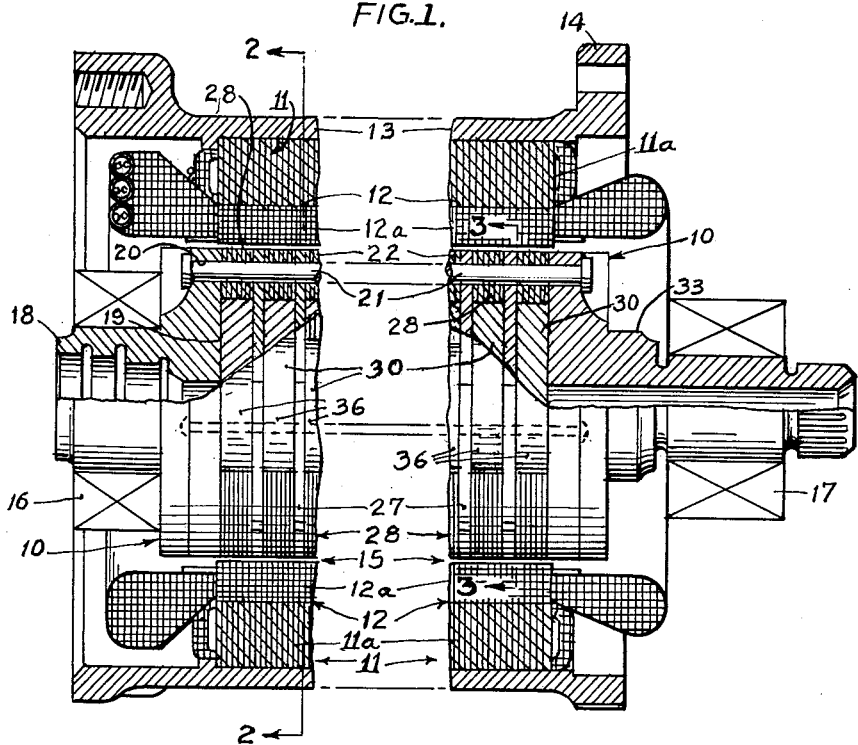
FIG. 1 is a side elevation, partly in cut-away cross-section, of a generator incorporating a rotor according to the invention.

A rotor 10 according to this invention is shown in FIG. 1 rotatably mounted within a stator 11. The details of the stator form no part of this invention and will not be described in detail here. The stator has the usual iron core 11a provided with slots 12 for receiving windings 12a. The means for applying and designing the windings for a stator of this type are well understood by persons skilled in the art, and will not be further described here. It suffices to say that this stator will have the desired windings in slots 12, and will also be provided with appropriate output leads. The stator has a case 13 which is provided with mounting flanges 14 for attachment to structure as desired. The stator is further provided with a rotor passage 15 within which the rotor rotates.

The rotor is supported by bearings 16, 17, which may be attached to any desired support such as pillow-blocks or the like (not shown).

The rotor includes a first hub 18 in bearing 16. Hub 18 may conveniently be the driven end of the rotor, which can be attached to driver means such as a turbine wheel, for example (not shown). This hub has a flat disc shaped end 19 with rivet holes 20 therethrough for receiving rivets 21 which hold the rotor together.

Figure 2:
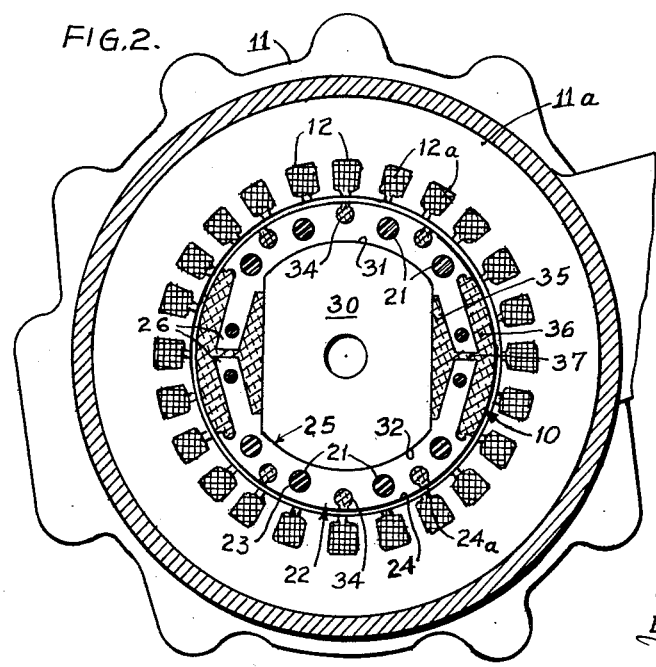
FIG. 2 is a cross-section taken at line 2—2 of FIG. 1.
Figure 3:
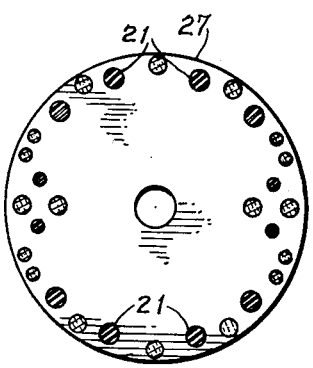
FIG. 3 is a plan view of a part of the device of FIG. 1.

As is best shown in FIG. 2, the pole pieces for this rotor are built up of laminated plates 2 which are also provided with holes 23 to pass the rivets 21. These plates are made of a soft magnetic material. They have an outer circular arcuate profile 24 with damper bar slots 24a cut therein. The inside central portion 25 of the plates is a smooth circular arc.

The ends of the laminated plates terminate in arms 26. The plates are stacked as shown in FIG. 2 so that the arms 26 reach toward each other, and are slightly spaced apart.

The rotor is made up in sections, the sections being divided by separator plates 27. These separator plates are of non-magnetic material, such as stainless steel. Each rotor pole piece section, such as section 28 may conveniently include about eight laminated plates, the laminations reducing eddy current losses. These sections are bounded by a separator plate on opposite sides thereof, except for the end sections which has a separator plate on one side and a hub on the other.

A permanent magnet 30 is placed in each section inside the opposed laminated plates. Each magnet has a pair of circular arcuate ends 31, 32 at the polar ends (north and south, respectively). The ends 31 and 32 have substantially the same radius as the inside central portions 25 of the laminated plates.

A second hub 33 at the opposite end of the rotor from hub 18 is journaled in bearing 17. It may conveniently have splines for attachment to power take-off means such as a gear reduction box (not shown).

The entire rotor structure, after riveting, is embedded in a cast metal such as aluminum, for example. In particular, this casting fills in the damper bar slots 24a to create damper bars 34. The casting also fills in the gaps 35 between the arms and the magnets, and the regions 36 outside the arms. The metal cast into regions 36 is keyed to the rotor by metal in the gap 37 between the opposed arms and holes in separator plates 27.

The assembling of this rotor will now be described. The assembly may conveniently start with the hub 18. Rivets 21 are passed through holes 20, and the laminated plates 22 of the first section are spindled onto the rivets. A permanent magnet 30 is then pressed into the space between the laminated plates. A separator plate is then spindled onto the rivets. Additional sections 28 may be added on to the rivets as desired, capping the last section with hub 33.

The loosely stacked rotor assembly is then compressed in a hydraulic press by forcing the hubs together. While applying this compressive force, the rivets are headed.

The riveted rotor is then cast in a metal mold so as to fill in the empty spaces as needed. The rotor is then chucked up in a lathe and turned down to a circular cylindrical shape, to a radius which is approximately .015"–.020" less than the radius of the rotor passage 15 for a rotor passage of about 2" diameter.

Such a rotor is capable of withstanding centrifugal forces resulting from a rotary rate of 48,600 r.p.m. without deformation which leads to unbalanced forces. With an appropriate stator and winding, this rotor has been used as a two pole, 6.5 kw., 6 phase, 23 volt (line to line), 800 c.p.s. machine (at a nominal 48,000 r.p.m.).

In particular, the provision of a one-piece magnet which is pressed into a continuous curved surface on the laminated plates creates an inherently more stable structure than has been previously attainable. The magnet exerts an expanding force against the laminated plates which is opposed by the laminated plates. The continuous contact between the single piece magnet and the laminated plates eliminates points of structural discontinuity at which local stresses might build up. In addition, the one piece magnet has no inherent tendency to get off balance, as has been the case with wedge-seated plural-piece magnets which have been known in the art.

This invention is not to be limited by the embodiments shown in the drawings and described in the description, which are given by way of example and not of limitation, but only in accordance with the scope of the appended claims.

I claim:

1. An integral rotor assembly for electrical apparatus comprising: a pair of opposed hubs; a plurality of magnetic sections disposed between said hubs; separator plate means disposed between adjacent magnetic sections; and fastener means holding said hubs, magnetic sections, and separator plate means in assembled stacked relation, said magnetic sections each comprising a plurality of flat laminated plates each having an inner arcuate surface and having a projection extending from each end thereof; a one-piece permanent magnet having surfaces matching said inner arcuate surfaces and disposed in press-fitted contact therewith; means defining interconnected cavities between said laminated plates and said magnet and between said laminated plates and the exterior of said rotor assembly; and metal means filling said cavities to thereby form said integral rotor assembly.

2. An integral rotor assembly for electrical apparatus comprising: a plurality of magnetic sections; separator plate means disposed between adjacent magnetic sections; fastener means holding magnetic sections and separator plate means in assembled stacked relation; said magnetic sections each comprising a plurality of flat laminated plates each having an inner arcuate surface and forming a first group and a second group, said first group having said inner surfaces thereof facing and spaced from the inner surfaces of said second group, and a projection extending from each group toward one another but spaced therefrom; a one-piece permanent magnet having surfaces matching said inner arcuate spaced surfaces and disposed in press-fitted contact therewith; said projections from each group defining a first cavity between said laminated plates and said magnet, a second cavity between said laminated plates and the exterior of said rotor assembly and a third interconnecting cavity formed by the space between said projections of each group and opening into both said cavities; means defining holes in said separator plate means in substantial alignment with said first and second cavities; and metal means filling said cavities and said holes in said separator plate means to thereby form an integral rotor assembly.

References Cited in the file of this patent

UNITED STATES PATENTS

| 1,275,292 | Neuland | Aug. 13, 1918 |
| 1,798,571 | Walther | Mar. 31, 1931 |
| 2,485,474 | Brainard | Oct. 18, 1949 |
| 2,488,729 | Kooyman | Nov. 22, 1949 |
| 2,806,160 | Brainard | Sept. 10, 1957 |

FOREIGN PATENTS

| 281,551 | France | July 1, 1952 |
| 459,295 | Great Britain | Jan. 5, 1937 |
| 786,004 | France | May 27, 1935 |
| 718,292 | Germany | Mar. 9, 1942 |